June 18, 1968 W. G. ROWELL 3,389,386
RELIABLE MONITORING SYSTEM
Filed Sept. 30, 1964
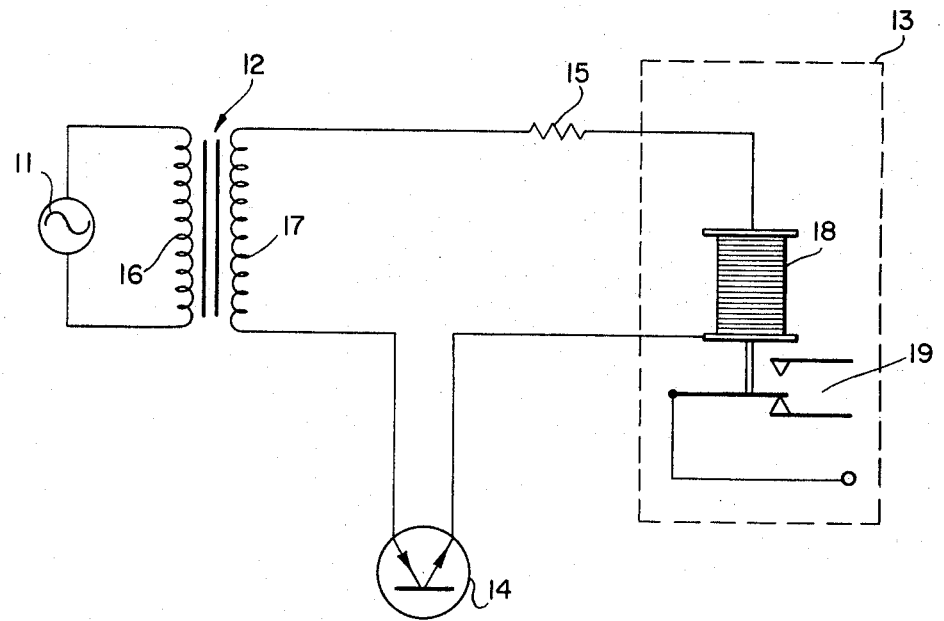
INVENTOR.
WILLIAM G. ROWELL
BY
ATTORNEYS

United States Patent Office 3,389,386
Patented June 18, 1968

3,389,386
RELIABLE MONITORING SYSTEM
William G. Rowell, Milton, Mass., assignor to Technical Marketing Associates, Inc., Concord, Mass., a corporation of Massachusetts
Filed Sept. 30, 1964, Ser. No. 400,383
2 Claims. (Cl. 340—248)

ABSTRACT OF THE DISCLOSURE

A fail-safe condition monitoring system including means for continuously self-checking the integrity of the system. The system employs a condition-actuated semiconductive sensor to rectify AC power causing an AC relay to pulsate. A short circuit in the sensor will cause the relay to remain steadily energized and an open circuit or lack of the condition being monitored will cause the relay to remain deenergized.

---

The present invention relates generally to detecting or monitoring systems and more specifically to a normal, inexpensive and reliable monitoring system which has the capability of self-checking the integrity of all components in the system and which will provide a warning signal whenever a predetermined condition exists or when any component part of the system fails.

Prior art detecting and monitoring systems have failed to provide simple, reliable circuits capable of checking themselves during operation. Some systems have achieved a far greater improvement in this respect than others, but unfortunately at a sacrifice of reliability due to the additional number of components required to obtain the results and due to the added costs of these additional components. Furthermore, the undesirable increase in circuit operational complexity due to the increased number of components can lead to additional problems such as a decrease in reliability of the system due to an increase of possible component failure. The present invention avoids the disadvantages of the prior art circuits and is primarily directed toward providing a novel circuit capable of continuously and automatically checking itself during its operation. The technique of the present invention is especially applicable to condition detecting apparatus for the detection of various forms or kinds of conditions directly or inferentially as well as sensing variables such as electromagnetic radiation, level detection, flow detection, flame detection, etc., as well as a great many other forms of systems currently utilized for monitoring, indicating, recording, and the like.

The present invention is particularly concerned with the problem of providing a warning signal or other indication and initiating controlling action when a predetermined condition occurs or upon failure of a component part of the circuit which would, in prior art systems, result in an unsafe failure.

For purposes of definition as herein used, an unsafe failure is that of failure wherein no signal or output indication whatsoever is produced by the monitoring system.

Thus, the monitoring system can be completely inoperative because of an unsafe failure and yet the monitoring output signal will falsely indicate that the system is properly functioning when, in fact, it is completely incapable of detecting the event or condition it is supposed to monitor.

It is, therefore, an object of the present invention to provide a novel method and apparatus for producing an improved monitoring arrangement wherein the integrity of the components and the condition detecting apparatus are continuously checked.

It is a further object of the present invention to accomplish the result obtained in a unique, practical, more reliable and less costly manner than heretofore. This is primarily due to the fact that fewer, less costly, less complex and less failure prone elements are utilized in a very simple, practical and straightforward manner to accomplish these objects of the invention. Consequently, maximum reliability and economy is achieved with a minimum of maintenance required.

In addition, it is a prime requirement of the invention to detect and indicate an unsafe failure condition caused by environment conditions or caused by component failures. It is a well-recognized fact that electronic, electrical or other components in a given monitoring or supervisory system have almost a predictable life expectancy. Therefore, it is not the fact that components are predestined to failure that is of primary concern to the subject invention, but rather how their eventual failure will cause the system to react—safe or unsafe.

Still another object is to provide the maximum degree of safety possible, commensurate with simplicity and reliability, by providing an indication, warning signal or control action, when loss of integrity occurs for any reason within defined limits of the system. For example, the condition sensor or transducer is often quite remote from the rest of the monitoring system and in the cabling or wiring therebetween a short circuit or open circuit can readily occur. Also, the sensor itself, because of internal defects or ambient conditions, could well become shorted or open circuited. Likewise, in the associated control or monitoring system, defects could occur through component failures or undesirable ambient conditions.

It is a very important object of the invention to produce the above results with a minimum of components or elements and thus inherently increase the overall system reliability and thereby reduce the nuisance shutdowns of the system caused by safe-failures. For example, some prior art devices may utilize and require use of various forms of shutters or masks to periodically obscure electromagnetic radiation or optical signals from reaching the sensor. Other prior art devices may utilize various forms of switching or modulating devices to influence either the sensor output signal or the input signal to the amplifier or the controlling device. These prior art devices referred to may well provide the necessary checking signal but inasmuch as many additional components are required in some cases, they are obviously subject to wear and tear and electrical failures, thus producing unnecessary shutdowns of the system—even though it is a fail-safe shutdown. Such unnecessary shutdowns can obviously in many cases be uneconomic and extremely undesirable.

The objects of the present invention are accomplished through use of a novel, automatic, fail-safe continuous self-checking technique which teaches that the condition-sensor is normally arranged to produce an asymmetrical signal upon occurrence of a predetermined condition which is thereupon transmitted through the system to indicating means adapted to respond to the said asymmetrical signals. The said indicating means is further adapted to respond in a still different manner to a asymmetrical signal indicative of a fault in the system. The said indicating means is still further adapted to respond in a still different manner to loss of any signal whatsoever which is indicative of a fault in a system. Thus, in the first instance, the indicating means is repetitively energized by the asymmetrical signal and in the second instance it is continuously energized and in the third instance continuously de-energized.

These and other important objects, advantages, accomplishments and advances provided by the present invention will be apparent to those skilled in the art upon reference to the following specifications, claims and drawing, in which:

The drawing shows a schematic arrangement of the preferred embodiment of the present invention.

Referring now to the drawing, a power source 11 is connected through a voltage conversion device 12 to a monitor 13 in series with a condition sensor 14 and a current limiting resistor 15.

More specifically, source 11 is preferably an alternating current source and device 12 is a transformer of the step-down variety with its primary winding 16 connected to source 11 and the secondary winding 17 series connected through current limiting resistor 15 to sensor 14 and a discriminating means or monitor 13. In the embodiment shown, sensor 14 is a photoactuated PNPN switch and monitor 13 is a relay having a coil 18. Relay 13 is designed to be capable of activating switch 19 which may be a single-pole double-throw or a double-pole double-throw make-break switch.

A specific model of the present invention shown in the drawing has been constructed utilizing the following specific components. This list of specific components as used in the model is not, however, to be construed as a limitation of the present invention but merely exemplary of the type of components that may be used.

Transformer 12—Triad F–40–X filament-transformer, 115 volts, 60 cycle primary, 26 volts secondary.
Resistor 15—100 ohm, 1 watt.
Relay 13—Sigma No. 11–F–Z, 100 ACS–SIL 9 volt, AC relay.
Sensor 14—International Rectifier Corporation Photodiode Number FLIS 2.

Components other than those listed can be readily substituted by one skilled in the art and, if desired, sensitivity of this system, as shown in the drawing, may be increased by altering the impedance values of resistor 15 and by selecting a more sensitive relay 13.

The operation of the device shown in the drawing is as follows: An illumination source, not shown, such as a 60 watt bulb is placed adjacent to sensor 14 so that when the illumination source is energized, radiant energy falling on sensor 14 permits a rectified current to flow through the circuit comprising winding 17, resistor 15, and relay coil 18. The relay 13 is so selected that it will respond to the uni-directional positive pulses flowing through sensor 14 by pulsating and actuating its associated switching contact 19. This pulsating or oscillatory motion of relay 13 produces a distinctive audible buzzing signal thereby indicating normal operation of the system. If desired, further indicating and control apparatus may be connected to switch 19. Such control or indicating apparatus as may be utilized are well known to the prior art.

Upon cessation of the predetermined amount of radiant energy falling upon sensor 14, the rectifying action will cease and the relay becomes de-energized. If any open circuit occurs in the system or in any particular component in the system, the relay also becomes de-energized. In either event, the audible signal produced by the pulsating relay 13 ceases indicating either a failure of the system or a component thereof or the elimination of the predetermined event. Additionally, if the relay solenoid 18 becomes shorted or the armature fails to mechanically pulsate, loss of the normal signal will also occur. However, if the sensor or the cabling thereto becomes shorted, the normal uni-directional current will change to a symmetrical AC current which will consequently hold the relay energized and thus cease pulsating and emitting the audible buzz indicating a fault in the system.

Further, if one desires, the indicating apparatus associated with switch 19 may be so designed as to indicate any of the above-described conditions. For example, an alarm system may be placed across switch 19 in such a manner that during normal operation two lights are flashing. While upon failure due to de-energization of coil 18, one light would be burning steady and the other out or upon holding in of the relay 13 due to an AC signal across coil 18, the first light would be out and the other burning steady. Other indicating means, such as bells, buzzers, etc., could also be used in such an alarm system. Further, the system could be designed to indicate only a failure of the system and exhibit no indication during normal operation.

From the above disclosure, it can be seen that the present invention teaches a simple, novel, completely fail-safe and automatic self-checking type of condition-monitoring system.

It is, of course, recognized that other forms of sensor elements could well be utilized by this invention, such as photo-emissive cells, photo-transistors, light-sensitive semiconductors, including light-activated switches, with or without gate circuits, thyratrons, discharge tubes, etc. It is also realized that use of this invention in connection with discharge tubes, photodiodes and the like, certain problems will be encountered in connection with use of DC supply voltage. In such cases, the sensor will continue to pass current even after the radiant energy falling upon it has been obscured. In order to quench this action, it has been found that when the relay 13 is energized it may be readily arranged in the system circuit to either (1) reduce the voltage to a point whereby conduction through the sensor is quenched, or (2) if the sensor has a gate circuit, change the bias sufficiently to quench conduction, or 3 reverse the polarity to the sensor, or (4) momentarily open or short circuit the sensor to quench conduction. Many well-known ways are available to those skilled in the art to selectively control conduction by the sensor to thereby produce the continuously cyclic or pulsating current necessary to practice the technique of the present invention in the manner herein disclosed.

It is my express intention to cover all such changes and modifications of the example of the present invention, herein chosen solely for purposes of disclosure, which do not constitute departures from the spirit and scope of the present invention as defined in the claims.

What is claimed is:
1. A fail-safe condition monitoring system, comprising:
a source of alternating current;
a condition sensor; and
an alternating current relay having a coil;
said sensor and said relay coil being connected in series across said current source;
said sensor acting as a half-wave rectifier when exposed to a first predetermined condition external to said system and further acting substantially as an open circuit when exposed to a second predetermined external condition;
said relay having double-throw switching means comprising first and second terminals and a movable member adapted for selectively making electrical contact with either of said terminals, said relay coil causing said movable member to alternately contact said terminals synchronously in response to half-wave rectified current in said circuit and causing said movable member to continuously contact said first terminal in response to unmodified alternating current from said source and causing said movable member to continuously contact said second terminal in response to an open circuit in said series circuit;
whereby said system provides indications of changes to which said condition sensor is exposed and of system integrity.

2. The system recited in claim 1, wherein:
said condition sensor is a semi-conductor light sensor which acts as a half-wave rectifier when illuminated and as an open circuit when not illuminated.

References Cited

UNITED STATES PATENTS

| | | | |
|---|---|---|---|
| 3,176,196 | 3/1965 | Dunigan | 317—124 X |
| 3,198,236 | 8/1965 | Puech | 340—409 |
| 3,277,280 | 10/1966 | Staples et al. | 317—148.5 X |
| 2,290,909 | 7/1942 | Hettenhausen | 317—156 XR |
| 3,047,773 | 7/1962 | Morton. | |

JOHN W. CALDWELL, *Primary Examiner.*

NEIL READ, *Examiner.*

D. MYER, *Assistant Examiner.*

UNITED STATES PATENT OFFICE
CERTIFICATE OF CORRECTION

Patent No. 3,389,386 June 18, 1968

William G. Rowell

It is certified that error appears in the above identified patent and that said Letters Patent are hereby corrected as shown below:

Column 2, lines 64 and 65, "asymmetrical" should read -- symmetrical --.

Signed and sealed this 25th day of November 1969.

(SEAL)
Attest:

Edward M. Fletcher, Jr.
Attesting Officer

WILLIAM E. SCHUYLER, JR.
Commissioner of Patents